US006767113B2

(12) United States Patent
Yao

(10) Patent No.: US 6,767,113 B2
(45) Date of Patent: Jul. 27, 2004

(54) MULTI-ANGLE REFLECTOR FOR USE IN A BACKLIGHT UNIT

(75) Inventor: Cheng-Hung Yao, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 0 days.

(21) Appl. No.: 10/217,640

(22) Filed: Aug. 13, 2002

(65) Prior Publication Data

US 2003/0095407 A1 May 22, 2003

(30) Foreign Application Priority Data

Nov. 19, 2001 (CN) .......................................... 90128621 A

(51) Int. Cl.[7] .................................................. F21V 7/04
(52) U.S. Cl. ........................ 362/297; 362/307; 362/346
(58) Field of Search ...................... 362/29, 30, 223–225, 362/240, 241, 245–247, 297, 307, 308, 346; 349/67, 70

(56) References Cited

U.S. PATENT DOCUMENTS

| 4,425,604 A | * | 1/1984 | Imai et al. ................... 362/223 |
| 4,599,684 A | * | 7/1986 | Lee ............................. 362/346 |
| 5,567,042 A | * | 10/1996 | Farchmin et al. ........... 362/241 |
| 6,491,411 B2 | * | 12/2002 | Itoh ............................. 362/246 |

FOREIGN PATENT DOCUMENTS

| JP | 05-323312 | | 7/1993 | |
| JP | 6052708 A | * | 2/1994 | ................. 362/240 |

* cited by examiner

*Primary Examiner*—Alan Cariaso
(74) *Attorney, Agent, or Firm*—Senniger, Powers, Leavitt & Roedel

(57) ABSTRACT

The present invention relates to a multi-angle reflector for use in a backlight unit. The back light unit comprises a plurality of lamps, a multi-angle reflector and a diffuser. The multi-angle reflector comprises a plate and a plurality of reflecting protrusions. The plate has a top surface toward to the lamps. The reflecting protrusions are respectively disposed on the top surface of the plate. Each reflecting protrusion has a reflecting surface. The reflecting surfaces have a plurality of reflecting angles corresponding to the top surface of the plate so that the light from lamps are adapted to reflect to the diffuser according to the reflecting angles. Therefore, according to the invention, the reflecting angles of the reflecting surfaces on the reflecting protrusions can be adjusted so as to suit to various actual conditions. The lights are uniform and the utility of the lights is improved. Because the reflecting protrusions are small, the reflector can be made into a thin type. For the whole structure, the thickness of the backlight unit is decreased.

7 Claims, 4 Drawing Sheets

MULTI-ANGLE REFLECTOR FOR USE IN A BACKLIGHT UNIT

BACKGROUND OF THE INVENTION

1. Field of the Invention

The present invention relates to a backlight unit, more particularly, to a multi-angle reflector for use in a backlight unit.

2. Description of the Related Art

Referring to FIG. 1, according to Japan Patent Publication No. 05-323312, the conventional backlight unit 1 comprises a plurality of lamps 11, a diffuser 12 and a reflector 13. The backlight unit 1 is disposed under a liquid crystal panel in the liquid crystal display device. The lamps 11, which can be fluorescent lamps, are used for providing light source. The diffuser 12, used in diffusing the light emitted from the lamps 11 to the liquid crystal panel, is placed above the lamps 11, and the material of the diffuser 12 is usually polymethymetharylate (PMMA) or polycarbonate (PC). The reflector 13, which is made of reflecting polycarbonate or polyethylene terephthalate (PET), is disposed under the lamps 11 for used for reflecting the bottom light source emitted from the backlight unit 1 to the diffuser 12.

Because the lamps 11 are disposed directly under the diffuser 12, the brightness is high in the direct under type of backlight unit 1. Furthermore, its weight is lighter than other types of backlight unit by the simple structure. In addition, when users look at the monitors, they will feel the view angles larger because there are no shelters above the diffuser 12 in the direct under type of backlight unit 1. On the other hand, the regions directly above the lamps 11 are brighter because the light emits directly onto the diffuser 12 while the regions between the lamps are darker. Thus, the lights are not uniform. Besides, enough space should be kept between the lamps 11 and the diffuser 12 in the direct under type of backlight unit 1 to avoid being over bright in view of that the lamps 11 emit light to the diffuser 12 directly. Therefore, compared with other types of backlight unit, the direct under type is thicker.

Besides, because the conventional reflector 13 is integrally made, the reflecting angles and the distance between the reflector 13 and lamps 11 are fixed. The reflecting angles of the reflector 13 cannot be adjusted according to the brightness, the number of the lamps 11 and the distance between the reflector 13 and lamps 11. The lights reflected to the diffuser 12 are not uniform.

Therefore, it is necessary to provide an innovative and progressive multi-angle reflector so as to solve the above problem.

SUMMARY OF THE INVENTION

One objective of the present invention is to provide a multi-angle reflector for use in a backlight unit. The backlight unit comprises a plurality of lamps, a reflector and a diffuser. The diffuser is disposed above the lamps. The multi-angle reflector is disposed under the lamps. The reflector with a plurality of reflection angles comprises a plate and a plurality of reflecting protrusions. The plate has a top surface facing the lamps. The reflecting protrusions are respectively disposed on the top surface of the plate. Each reflecting protrusion has a reflecting surface. The reflecting surfaces have respective reflecting angles corresponding to the top surface of the plate so that the lights from lamps are adapted to reflect to the diffuser according to the reflecting angles.

Therefore, according to the invention, the reflecting angles of the reflecting surfaces on the reflecting protrusions can be adjusted so as to suit to the number of lamps and the distance between lamps and the reflector. The lights are reflected to the diffuser by various reflecting angles, and the lights are uniform and the utility of the lights is improved. Because the reflecting protrusions are small, the reflector can be made into a thin type. For the whole structure, the thickness of the backlight unit is decreased.

DETAILED DESCRIPTION OF THE INVENTION

Figure 2A:
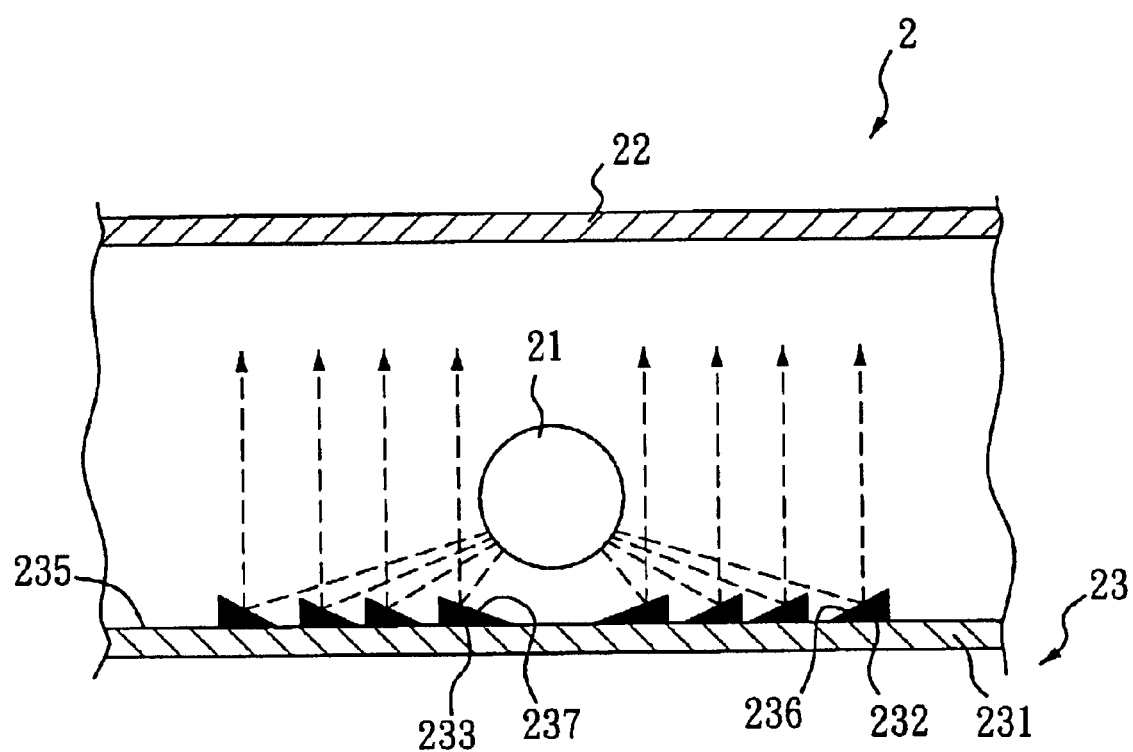
FIG. 2a shows a partial cross-section view of a backlight unit, according to the first embodiment of the invention.

Referring to FIG. 2a, according to the first embodiment of the invention, the backlight unit 2, which is disposed under a liquid crystal panel in the liquid crystal display device, comprises a plurality of lamps 21 (only a lamp 21 shown in the figure), a diffuser 22 and a reflector 23. The diffuser 22 is disposed above the lamps 21. The reflector 23 with a plurality of reflecting angles is disposed under the lamps 21, and the reflector 23 is used for reflecting the lights from lamps 21 to the diffuser 22.

The multi-angle reflector 23 comprises a plate 231 and a plurality of reflecting protrusions 232 and 233. The plate 231 has a top surface 235 facing the lamps 21. The reflecting protrusions 232 and 233 are respectively disposed on the top surface 235 of the plate 231. Each reflecting protrusion has a reflecting surface. In other words, the reflecting protrusion 232 has a reflecting surface 236, and the reflecting protrusion 233 has a reflecting surface 237. The reflecting angle of the reflecting surface 236 on the reflecting protrusion 232 with respect to the top surface 235 of the plate 231 is different from that of the reflecting surface 236 on the reflecting protrusion 233. Therefore, the lights are reflected in different angles.

The distances between lamps and the reflecting protrusions are different, and the angles of incidence to the reflecting surfaces are different. If the reflecting angles on the reflecting surfaces are fixed, the lights cannot be reflected uniformly to the diffuser. According to the invention, the reflecting angles of the reflecting protrusion are different so as to correspond to the various distances and the angles of incidence. Therefore, the lights from lamp 21 can be reflected uniformly to the diffuser 22.

Figure 2B:
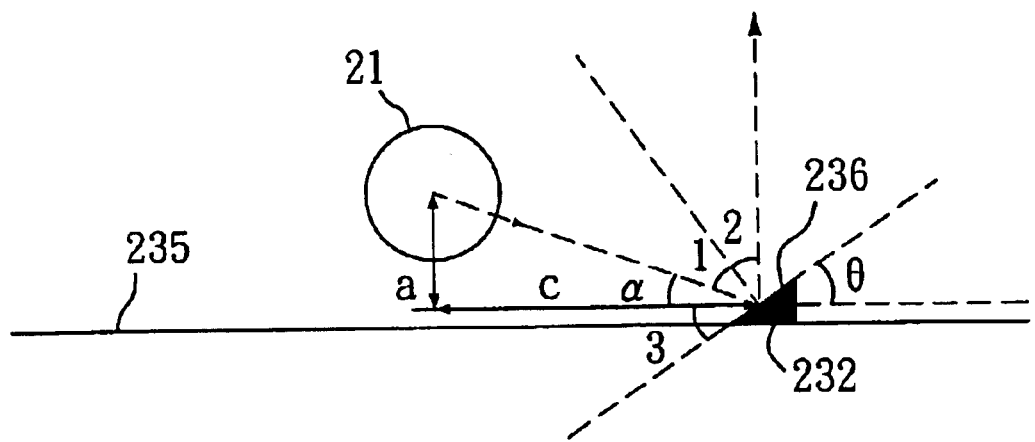
FIGS. 2b to 2c shows the reflecting angles of the backlight unit, according to the first embodiment of the invention.

Referring FIG. 2b, the reflecting protrusion 232 being taken as an example, the perpendicular height between lamp 21 and the reflecting surface 236 of the reflecting protrusion 232 is (a). The horizontal distance between lamp 21 and the reflecting surface 236 of the reflecting protrusion 232 is (c). The angle between the incident light from lamp 21 to the reflecting surface 236 and the horizon is ($\alpha$). The reflecting angle of the reflecting surface 236 of the reflecting protrusion 232 is ($\theta$). If the reflecting lights are designed to be perpendicular to the top surface 235, the reflecting angle (θ) of the reflecting surface 236 should be calculated as follows.

$$L3 = L\theta$$

$$L1 = \frac{\pi}{2} - L\alpha - L\theta \quad (\because L1 + L\alpha + L3 = \frac{\pi}{2})$$

$$\frac{\pi}{2} - L\alpha = L1 + L2 \quad (\because L\alpha + L1 + L2 = \frac{\pi}{2})$$

$$= 2(\frac{\pi}{2} - L\alpha - L\theta) \quad (\because L2 = L1)$$

$$= \pi - 2L\alpha - 2L\theta$$

$$L\theta = \frac{\pi}{4} - \frac{1}{2}L\alpha$$

$$= \frac{\pi}{4} - \frac{1}{2}\operatorname{Tan}^{-1}\frac{a}{c}$$

Figure 2C:
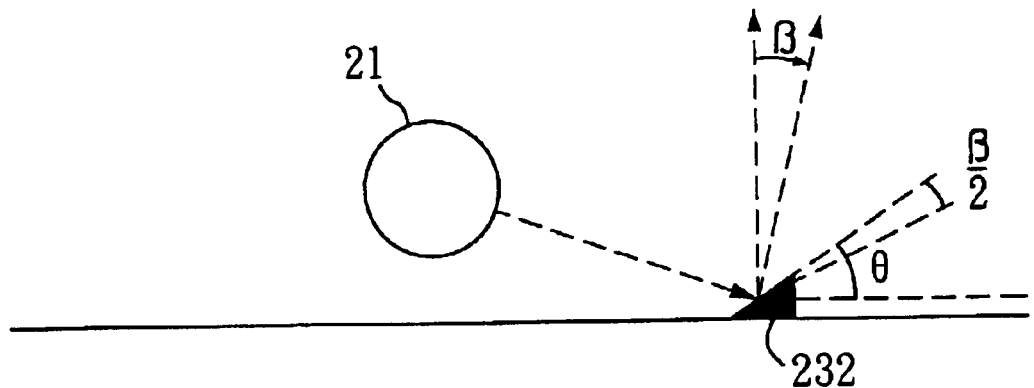

Referring to FIG. 2c, if the reflected lights are designed to shift (β) degrees, the reflecting angle (θ) of the reflecting surface should decrease by (β/2) degrees.

Therefore, in the case of the reflecting surface of the reflecting protrusion having the perpendicular height (a) and the horizontal distance (c) to lamp 21, if the angle of the reflected light is (β), the reflecting angle (θ) should be designed to:

$$< \theta = \frac{\pi}{4} - \frac{1}{2}\operatorname{Tan}^{-1}\frac{a}{c} - \frac{\beta}{2} \quad (1)$$

wherein:

β=0 when the reflected light is normal to the top surface 235 of the plate 231;

β>0 when the angle of the desired reflected light is directed toward a divergent direction in a divergent manner, with respect to the normal reflected light in view of the top surface 235; and β<0 when the angle of the reflected light is directed toward a covergent direction in a convergent manner, with respect to the normal reflected light in view of the top surface 235.

The reflector 23 can be manufactured by injection molding method to perform the plate 231 and the reflecting protrusions 232, 233. Then, the reflecting surfaces 236, 237 are coated with a reflecting layer with reflection material, which may be aluminum or silver metal. The reflector 23 can also be made by cast method to form the reflector with a plurality of reflecting protrusions. Besides, a metal plate can be processed to form a plurality of reflecting protrusions.

Figure 1:
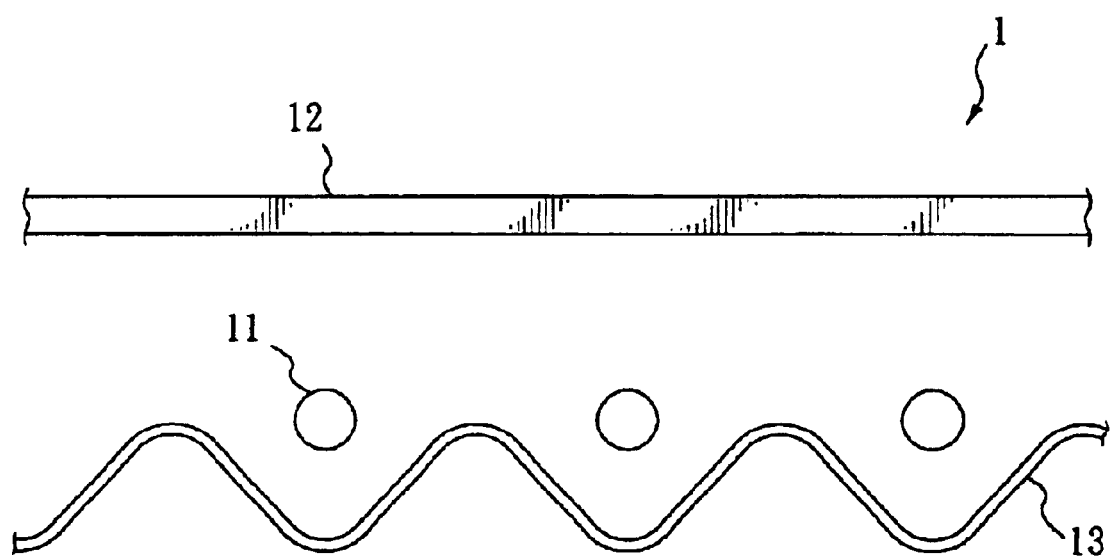
FIG. 1 shows a partial cross-section view of the conventional backlight unit.

According to the number of lamps 21 and the distance between lamp 21 and the reflector 23, the reflecting angles of the reflecting surfaces on the reflecting protrusions can be adjusted so as to reflect the light as designed to the diffuser. Furthermore, the reflecting protrusions 232, 233 are small and are formed on the top surface 235 of the plate 231. Compared to the conventional reflector 13 in FIG. 1, the reflector 23 of the invention is thinner, and the space occupied by the reflector 23 is small. For the whole structure, the thickness of the backlight unit of the invention is decreased.

Figure 3:
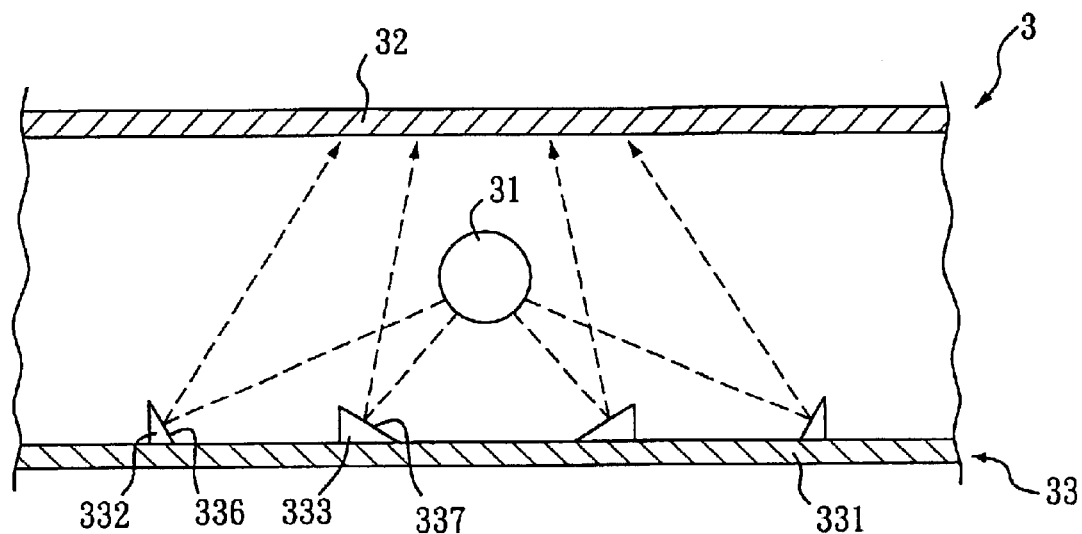
FIG. 3 shows a partial cross-section view of a backlight unit, according to the second embodiment of the invention.

Referring to FIG. 3, according to the second embodiment of the invention, the backlight unit 3 comprises a plurality of lamps 31 (only a single lamp 31 is shown in the figure), a diffuser 32 and a multi-angle reflector 33. The multi-angle reflector 33 comprises a plate 331 and a plurality of reflecting protrusions 332, 333. The reflecting protrusions 332, 33 of the reflector 33 are designed so that the lights reflected to the diffuser are converged. The reflecting protrusions 332, 333 are triangle protrusions, and the reflecting surfaces 336, 337 are the oblique side of the triangle protrusions 332, 333. The reflecting angle θ of the reflecting surface 336, 337 is determined by Equation (1) at the condition of β<0.

Figure 4:
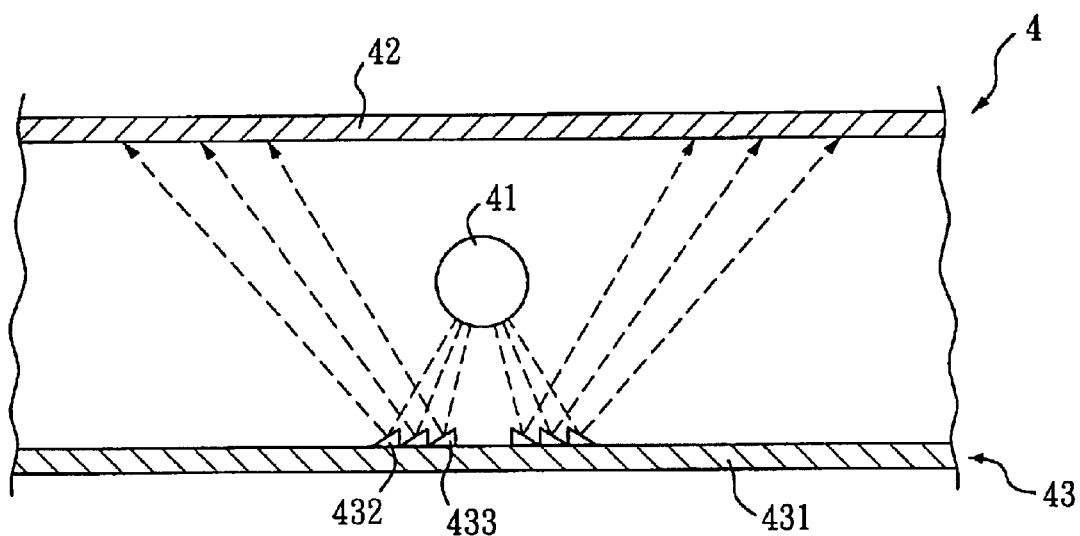
FIG. 4 shows a partial cross-section view of a backlight unit, according to the third embodiment of the invention.

Referring to FIG. 4, according to the third embodiment of the invention, the backlight unit 4 comprises a plurality of lamps 41 (only a single lamp 41 is shown in the figure), a diffuser 42 and a multi-angle reflector 43. The multi-angle reflector 43 comprises a plate 431 and a plurality of reflecting protrusions 432, 433. The reflecting protrusions 432, 433 of the reflector 43 are designed so that the lights reflected to the diffuser are diverged. The reflecting angle θ of the reflecting surface of the reflecting protrusions 432. 433 is determined by Equation (1) at the condition of β>0.

Therefore, the multi-angle reflector of the invention can have various types. The reflecting angles of the reflecting protrusions can be adjusted so as to suit various actual conditions.

While an embodiment of the present invention has been illustrated and described, various modifications and improvements can be made by those skilled in the art. The embodiment of the present invention is therefore described in an illustrative but not restrictive sense. It is intended that the present invention may not be limited to the particular forms as illustrated, and that all modifications which maintain the spirit and scope of the present invention are within the scope as defined in the appended claims.

What is claimed is:

1. A multi-angle reflector for use in a backlight unit which is disposed under a liquid crystal panel in the liquid crystal display device, in which the backlight unit has a plurality of lamps disposed above the reflector and a diffuser disposed above the lamps, the multi-angle reflector comprising:

a plate, having a top surface facing the lamps;

a plurality of reflecting protrusions, each disposed on the top surface of the plate and having a reflecting surface, the reflecting surfaces of the reflecting protrusions having respective reflecting angles with respect to the top surface of the plate so that lights coming from the lamps are adapted to reflect to the diffuser according to the reflecting angles, wherein the reflecting angle of the reflecting surface is <θ=π/4−½ tan$^{-1}$ (a/c)−β/2, wherein θ is the reflecting angle between the reflecting surface of the reflecting protrusion and the top surface of the plate, a is the vertical height between the center of the lamp and the center of the reflecting surface of the protrusion, c is the horizontal distance between the center of the lamp and the center of the reflecting surface of the protrusion, and β is the angle between the reflected light and the plane vertical to the top surface.

2. The multi-angle reflector according to claim 1, wherein the each of the reflecting surfaces of the reflecting protrusions is coated with a layer of reflecting material.

3. The multi-angle reflector according to claim 1, wherein each of the reflecting protrusions has a substantially triangular cross section, and the reflecting surface is a side of the substantially triangular cross section.

4. The multi-angle reflector according to claim 1, wherein each of the reflecting surfaces of the reflecting protrusions is planar.

5. The multi-angle reflector according to claim 1, wherein the lights reflecting from the reflecting protrusions to the diffuser are substantially perpendicular to the top surface of the plate with β=0.

6. The multi-angle reflector according to claim 1, wherein the lights reflecting from the reflecting protrusions converge to the diffuser with β<0.

7. The multi-angle reflector according to claim 1, wherein the lights reflecting from the reflecting protrusions diverge to the diffuser with β>0.

* * * * *